Nov. 2, 1965    E. M. SCHLUMBERGER ETAL    3,214,963
DETECTION OF A FAILURE IN A CONTAINER
Filed Aug. 26, 1963    2 Sheets-Sheet 1
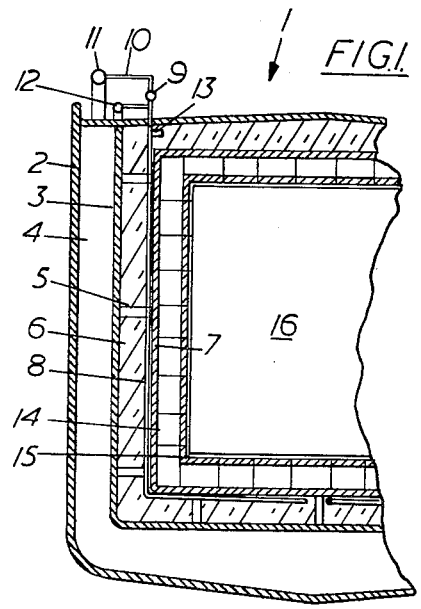
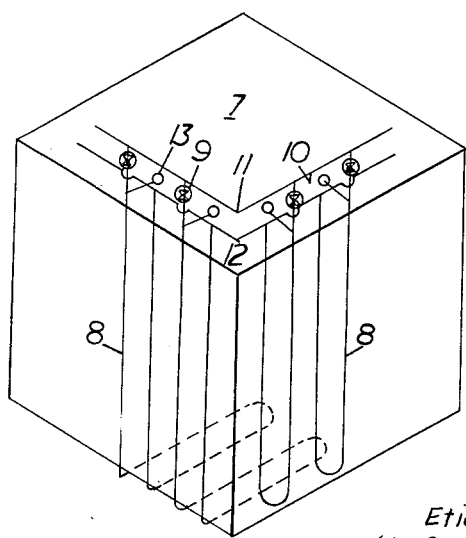
Inventors
Etienne M. Schlumberger
& Reinier H. Meyer
By
Max L. Libman    Attorney

United States Patent Office 3,214,963
Patented Nov. 2, 1965

3,214,963
DETECTION OF A FAILURE IN A CONTAINER
Etienne Maurice Schlumberger, London, England, and Reinier Hendrik Meyer, Wassenaar, Netherlands, assignors to Conch International Methane Limited, Nassau, The Bahamas, a Bahamian company
Filed Aug. 26, 1963, Ser. No. 304,503
Claims priority, application Great Britain, Dec. 27, 1962, 48,614/62
7 Claims. (Cl. 73—49.2)

This invention concerns improvements in or relating to the detection of a failure in a container. More particularly, the invention concerns a method of detecting a failure in a container for a liquefied gas by detecting a cold spot in a wall of an insulated container; a container for a liquefied gas equipped for that purpose; and ships comprising such containers.

In this specification, the expression "liquefied gas" means liquid that boils at atmospheric pressure at a temperature below the ambient temperature, for example liquefied natural gas (which consists almost entirely of volatile hydrocarbons, for instance methane), ethane, propane, hydrogen, nitrogen and oxygen.

In the storage or transport of a liquefied gas, any liquefied gas and cold gas leaking from a container may cause the temperature of a surrounding structure (for example the hull of the ship) to fall below the embrittlement temperature of the material of the surrounding structure, thereby rendering the structure liable to crack and fail. This risk of the failure of a surrounding structure is of particular concern in the case of a ship comprising a container for a liquefied gas, particularly when the liquefied gas is liquefied natural gas, which boils at a temperature of minus 258° F. at atmospheric pressure. If the container should fail, liquefied gas and cold gas leaking from the container will produce a cold spot (namely an area of lower temperature) where the leakage occurs. An object of the invention is to provide a method of detecting a failure in a container by detecting such a cold spot.

According to the invention, a method of discovering a failure in a container for a liquefied gas by detecting a cold spot in a wall of the container is one in which a gas comprising a carrier gas and the vapour of a substance that will solidify at the temperature of the cold spot is passed through a pipe located near the outside of the said wall in a position where the temperature is normally above the dew-point of said vapour, and any reduction in the flow of the gas passing through the pipe is detected.

If the container should fail, a cold spot produced in the outside of the container causes a layer of solid to be produced on the inner surface of the pipe from the vapour content of the gas in the pipe. This solid reduces the flow of the gas through the pipe and causes an increase in pressure at the inlet end of the pipe. The reduction in the flow of the gas or the increase in pressure in the pipe can be used to operate any suitable warning system, thereby enabling remedial action to be taken in good time. Thus, a diaphragm type pressure detector, actuating a pneumatic or low-voltage warning system, can be connected directly to an early point in the pipe to detect pressure change at that point, or across a resistance to flow in said pipe to indicate a change in rate of flow. If the container is a composite container comprising a housing enclosing a tank for a liquefied gas and the tank is thermally insulated from the housing, the detection of a cold spot in a wall of the housing can indicate that the tank or the insulation or both have failed.

The gas generally most convenient for use in the invention is air as the carrier gas, with a sufficient content of water vapour to condense and freeze at the temperature of the cold spot. In such a case, the dew-point of the gas under the pressure conditions in the pipe should be below the lowest ambient temperature expected in the vicinity of the pipe in the absence of leakage from the container, so as to ensure that any fall in the ambient temperature does not cause the temperature of the carrier gas to fall below its dew-point and bring about accidental condensation of vapour in the pipe. When the container is located in a ship the dew-point can conveniently be about 5° C. below the lowest ambient temperature expected in the absence of leakage from the container. The flow rate of the carrier gas under normal conditions will affect the time to detect the abnormal conditions of a cold spot; in general, the greater the flow rate the shorter the time for detecting a cold spot.

Besides the method according to the invention, the invention includes a container for a liquefied gas equipped for detecting a failure thereof by that method, said container comprising a pipe located near the outside of a wall of the container; means for passing through said pipe a gas comprising a carrier gas and the vapour of a substance that will solidify at the temperature of the cold spot; and detector means fitted to the pipe for detecting any change in flow in said pipe consequent on the formation of an obstruction therein. The invention also includes ships equipped with such containers.

When the wall of the container comprises a number of sections joined together, the pipe can be best located over joints in said wall, (e.g., vertically and horizontally disposed joints) because the joints are the parts where the container is most likely to fail. The pipe can be a single length, but generally it is more convenient to use several lengths in parallel each provided with its own pressure or flow detector means. The pipe can be made of any suitable material that will withstand the conditions of pressure and temperature of operation, including those occurring in leakage and detection thereof. Metal (for example copper) is generally convenient. If desired, the pipe can be fitted at its outlet end with suitable pressure reduction means, so as to maintain a suitable working pressure in the pipe.

The invention will now be further described with reference to the accompanying drawings, in which:

FIGURE 1 is a schematic vertical section of a part of a ship comprising a composite tank for the transport of liquefied natural gas, in which any failure of the tank is detected according to the invention.

FIGURE 2 is a simplified perspective view indicating how pipelines are arranged on the outside of the housing of the composite tank shown in FIGURE 1.

Figure 3:
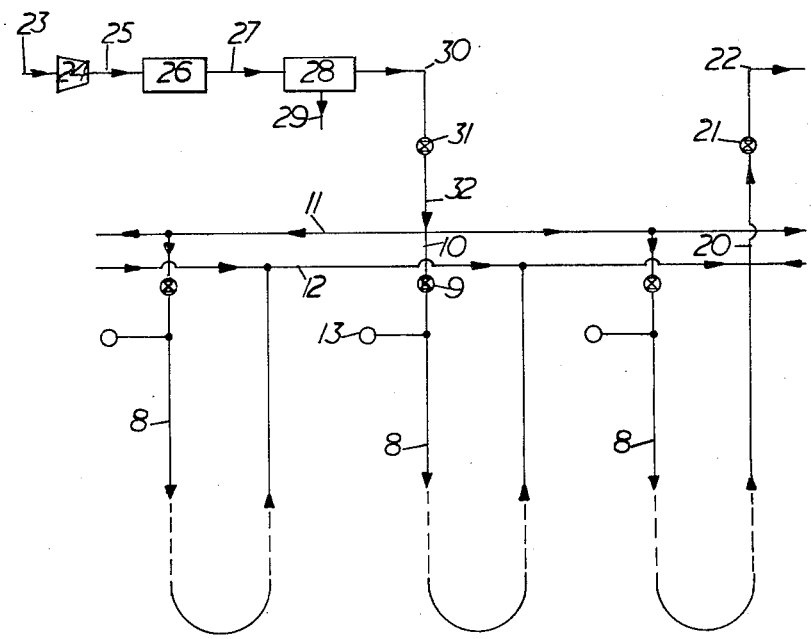
FIGURE 3 is a flow sheet indicating how a cold spot produced in the outside of the housing of the composite tank shown in FIGURES 1 and 2 can be detected.

In FIGURE 1, a ship 1 has an outer hull 2 and an inner hull 3 inwardly spaced therefrom, both hulls being fabricated from steel. Ballast water can be kept in space 4 between the hull. Inwardly spaced from inner hull 3 and separated therefrom by wooden spacers 5 and blocks 6 of rigid polyurethane foam is a liquid tight prismatic housing 7 fabricated from panels of ply wood. Spacers 5 and blocks 6 are arranged so as to provide a vertical channel for the passage of a copper pipeline 8. Pipeline 8 is connected via a reduction valve 9 to an outgoing branch pipeline 10 of a manifold 11 on the deck of the ship, and leads down over the outside of a wall of housing 7, over joints in said wall; under said housing to midships; and then back and up the outside of said wall to a manifold 12 also on the deck of the ship. Manifold 11 can provide wet air under a high pressure; the air after having passed through pipeline 8 enters manifold 12. The part of pipeline 8 above the top of said wall is provided with a diaphragm switch 13 below valve 9. Switch 13 is actuable by a rise in pressure at the inlet end of pipeline 8 to operate a low-voltage electrical warning system located in the control room of the ship. Further pipelines 8 fitted with switches 13 are similarly provided for the remainder of the wall and for the opposite wall of housing 7; the other two walls of housing 7 are also similarly provided with pipelines 8 fitted with switches 13, except that those pipelines do not pass under housing 7. These two different ways of arranging pipelines 8 on the outside of housing 7 are indicated in FIGURE 2. Immediately within housing 7 are balsa wood blocks 14 provided with plywood facings 15 on their inner faces. These blocks enclose a space for a prismatic cargo tank 16 of stainless steel for the transport of liquefied natural gas. When the cargo tank is charged or being charged with liquefied natural gas, the walls of the cargo tank are in sliding contact with facings 15.

In FIGURE 2, there is shown the two different ways how pipelines 8 are arranged on the outside of housing 7. The parts of pipelines 8 that pass under housing 7 are indicated by broken lines.

In FIGURE 3, the flowsheet deals with the detection of a cold spot in the outside of one wall or part of the bottom of housing 7 produced by leakage of cold gas and liquid cargo tank 16. The parts of pipelines 8 passing under housing 7 are indicated by broken lines. A cold spot produced in any of the other walls of the remainder of the bottom of housing 7 can be detected in a similar way.

According to the flow sheet, air containing water vapour and under a pressure of $P_2$ p.s.i.g. and at substantially ambient temperature passes from pipelines 10 through reduction valves 9 into pipelines 8. The resultant air in pipelines 8 is under a lower pressure of $P_3$ p.s.i.g. and has a dew-point of $T_3°$ C. about 5° C. below the lowest ambient temperature expected in the vicinity of pipelines 8 in the absence of leakage from tank 16. The air passes from pipelines 8 into manifold 12, and thence via an air pipeline 20, a reduction valve 21 and a further air pipeline 22 out of the system under atmospheric pressure.

The air in pipelines 10 upstream of reduction valves 9 is provided in the following manner. Air at atmospheric pressure and at ambient temperature enters the system via an pipeline 23 and passes into a compressor 24, in which it is compressed to a high pressure $P_1$ p.s.i.g. The compressed air passes from compressor 24 via an air pipeline 25 into a saturator 26 in which it is saturated with water vapour. The air passes from saturator 26 via an air pipeline 27 into a cooler 28 that is part of the ship's refrigerator. In cooler 28, the air is cooled to a lower temperature $T_2°$ C. and part of the water vapour in the air is precipitated; the condensed water is run off via a water pipeline 29 fitted to an automatic drain (similar to a steam trap) forming part of the cooler. Air saturated with water passes from the cooler 28 under a pressure of $P_1$ p.s.i.g. and at a temperature $T_2°$ C. into an air pipeline 30. In pipeline 30, the air is allowed to warm up to ambient temperature and the air ceases to be saturated with water. The air in pipeline 30 passes via a pressure regulation valve 31 and a further air pipeline 32 into manifold 11. The air in manifold 11 is substantially at ambient temperature and is under a lower pressure $P_2$ p.s.i.g. The air passes from manifold 11 into outgoing branch pipelines 10 and then through reduction valves 9 into pipelines 8 lying on the outside of housing 7. The resultant air in pipelines 8 is used the lower pressure of $P_3$ p.s.i.g. The dew-point $T_3°$ C. of this air is made about 5° C. less than the lowest ambient temperature expected in the vicinity of pipelines 8 in the absence of leakage from tank 16 by choosing suitable values for $P_1$ p.s.i.g. and $T_2°$ C. (the pressure and temperature respectively in cooler 28), which together govern the amount of water in the air entering pipelines 8.

If a failure should occur in cargo tank 16, cold gas and liquid escaping therefrom produces a cold spot in the wall of housing 7 underneath pipelines 8. The cold spot causes the temperature of the pipeline 8 nearest to it to fall below the dew-point of the wet gas in said pipeline, thereby causing condensation of water in the pipeline. The condensed water freezes and produces a layer of ice on the inside of the pipeline 8. The ice reduces the flow of wet air through the pipeline, thereby increasing the pressure $P_3$ at the inlet of the pipeline to a higher pressure $P_4$ p.s.i.g. The increase in the pressure actuates switch 13 in the pipeline. The actuation of switch 13 operates the warning system in the ships control room and enables remedial action to be taken. Moreover, because the position of the pipeline containing the switch is known the actuation of the switch will also indicate the horizontal position of the cold spot in the housing.

In an example of the application of the method according to the flowsheet, the pressure and temperature conditions were as set out in the following table:

$P_1$ ---------------------------------------- p.s.i.g__ 25.7
$P_2$ ---------------------------------------- p.s.i.g__ 20.0
$P_3$ ---------------------------------------- p.s.i.g__ 5.5
$T_2$ ---------------------------------------- ° C__ +4.0
$T_1$ ---------------------------------------- ° C__ −5.0

Under those conditions and using a flow rate of 300 litres/hour of wet gas passing through pipelines 8 each consisting of 100 feet, ⅛ inch bore copper tubing, a 1 foot square cold spot produced in the outside housing 7 by a failure of cargo tank 16 caused the pressure $P_3$ to rise to a pressure $P_4$ of 10 p.s.i.g. in 30 minutes, as indicated by the actuation of a switch 13 and the operation of the associated warning system. Remedial action was then taken. The gradual increase in pressure indicated that the cold spot was slow in forming and that the failure in tank 16 was not a major one.

We claim:
1. A method of discovering a failure in an insulated container for a liquefied gas by detecting a cold spot in a wall of the container comprising
 (a) passing a mixture of a gas and the vapor of a substance that will solidify at the temperature of the cold spot through a thermally conductive tube of small bore,
 (b) positioning the tube against the outside of the wall of the container near points of possible failure,
 (c) establishing a flow of said gas and vapor at a predetermined pressure through said tube, and
 (d) detecting a reduction in flow of said gas and vapor in said tube due to a drop in temperature at the wall of said insulated container below the dew-point of said vapor sufficient to cause freezing out of said vapor on the inner wall of said tube.

2. A method as claimed in claim 1, in which the carrier gas is air.

3. A method as claimed in claim 2, in which the vapour of the substance that will solidify at the temperature of a cold spot is water vapour.

4. A method as claimed in claim 3 in which the gas has a dew-point about 5° C. below the lowest ambient temperature which is likely in the absence of leakage from the container.

5. A method of discovering a failure in an insulated container for liquefied gas by detecting a cold spot in a wall of the container comprising
 (a) passing gas at an elevated pressure in contact with a vapor of a substance that will solidify at the temperature of the cold spot so as to saturate the compressed gas with said vapor,
 (b) cooling the gas to a lower temperature below ambient sufficiently to precipitate out some of the vapor, (c) raising the temperature of the gas to ambient temperature,
(d) passing the gas through a thermally conductive tube of small bore to establish a flow of said gas and vapor at a predetermined pressure through said tube,
(e) positioning the tube adjacent the outside of the wall of the container near points of possible failure, in thermally conductive relationship with said wall,
(f) and detecting an increase in pressure of the gas in the tube due to freezing out of said vapor on the inner wall of the tube.

6. A container for a liquefied gas equipped for discovering a failure thereof comprising a thermally conducted pipe located adjacent the outside of a wall of the container in thermal conducting relationship therewith; means for passing through said pipe a gas comprising a carrier gas and the vapour of a substance that will solidify at the temperature of a cold spot on the outside of said wall due to leakage of liquefied gas; and detector means fitted to the pipe for detecting any change in flow in said pipe consequent on the formation of an obstruction therein.

7. A container as claimed in claim 6 in which one or more walls comprise a number of sections joined together and the pipe is located over the joints in said wall or walls.

References Cited by the Examiner
FOREIGN PATENTS
888,247    1/62    Great Britain.

RICHARD C. QUEISSER, *Primary Examiner.*